United States Patent [19]

Svarz et al.

[11] Patent Number: 5,866,041
[45] Date of Patent: Feb. 2, 1999

[54] FATTY ACID DEFOAMERS WITH IMPROVED SHELF LIFE

[75] Inventors: James J. Svarz; Ryan A. Gabel, both of Naperville, Ill.

[73] Assignee: Nalco Chemical Company, Naperville, Ill.

[21] Appl. No.: 883,026

[22] Filed: Jun. 26, 1997

[51] Int. Cl.⁶ .................................................. B01D 19/00
[52] U.S. Cl. ......................... 252/358; 252/309; 252/321
[58] Field of Search .................................... 252/312, 314, 252/321, 358, 309

[56] References Cited

U.S. PATENT DOCUMENTS

| | | | |
|---|---|---|---|
| 4,013,475 | 3/1977 | Liebowitz et al. | 252/309 |
| 4,225,456 | 9/1980 | Schmidt et al. | 252/321 |
| 4,631,145 | 12/1986 | Zychal | 252/321 |
| 4,664,844 | 5/1987 | Bergold et al. | 252/321 |
| 4,806,266 | 2/1989 | Burrill | 252/321 |
| 4,918,123 | 4/1990 | Yang et al. | 524/110 |
| 4,976,888 | 12/1990 | De Clercq et al. | 252/358 |
| 5,326,499 | 7/1994 | Wegner et al. | 252/358 |
| 5,391,321 | 2/1995 | Gruning et al. | 252/309 |
| 5,679,286 | 10/1997 | Wollenweber | 252/321 |

*Primary Examiner*—Richard D. Lovering
*Assistant Examiner*—Daniel S. Metzmaier
*Attorney, Agent, or Firm*—Hill & Simpson

[57] ABSTRACT

The present invention provides an antifoam emulsion with improved shelf-life and a method for making same. The improved shelf-life results from dispersing a fatty alcohol dispersion in an emulsion of another liquid. To this end, the antifoam emulsion of the present invention includes an internal phase of a fatty alcohol dispersion, an emulsifier, and an external phase including a water insoluble or partially miscible liquid.

18 Claims, No Drawings

FATTY ACID DEFOAMERS WITH IMPROVED SHELF LIFE

BACKGROUND OF THE INVENTION

The present invention generally relates to antifoams for use in the paper industry. More specifically, the present invention relates to fatty alcohol antifoams with improved shelf life.

Foam is a material made up of gas bubbles separated from one another by films of liquid. Although foams of exceptional stability are desired in some commercial applications, foam is a nuisance in many situations. For instance, in the glue and paper industries, foams cause undesirable complications. A common recourse is the addition of chemical antifoams, which are sometimes insoluble liquids of very low surface tension. When a droplet of such a liquid is sprayed onto the foam or is carried into it by mechanical agitation, it spreads spontaneously and rapidly at the surface of the film, virtually sweeping the foam away as it does so. Liquids frequently used for this purpose are octyl alcohol, tributyl phosphate, silicone and many patented preparations.

Antifoams, such as fatty alcohol defoamers, thus serve a critical function in a variety of industries, such as the paper industry. However, a disadvantage of commercial antifoam formulations is their limited shelf-life. Known antifoams often cream during storage and in some cases thicken to such an extent that they can no longer be pumped. This thickening or gelation renders the application of the fatty alcohol active ingredient to a foaming system difficult at best, limiting the sale of products containing substantially the fatty alcohol active ingredient.

Moreover, another disadvantage of known antifoams is that they are ineffective at elevated temperatures. Antifoam emulsions, which are conventionally used in papermaking, are known to become less effective if the temperature of the aqueous system to be defoamed increases above 50° C. At temperatures above 60° C., an even more rapid decrease in the effectiveness of the antifoam occurs when known oil-in-water emulsions are used. Since an increasing tendency for water circulations in the paper mills is to be closed ones, the result is that the temperature of the water conveyed in the circulation increases during papermaking, so that the effectiveness of the antifoams used to date decreases substantially.

Therefore, a need exists for a fatty alcohol antifoam formulation with improved shelf life and improved elevated temperature performance.

SUMMARY OF THE INVENTION

The present invention provides a fatty alcohol defoamer with increased shelf-life as well as improved performance under elevated temperature conditions. The improved shelf-life of the present invention results from providing the active ingredient of an antifoam formulation, namely a water-based dispersion of the substantially fatty alcohol ingredient, in a form that is insensitive to increases in viscosity or age. In this regard, the present invention provides forming a mixed emulsion wherein the fatty alcohol water-based dispersion is contained as the internal or dispersed phase of another fluid. Whereas, the improved elevated temperature performance results from the addition of hydrophobic particles to the external or continuous phase of the emulsion.

The present invention provides an antifoam emulsion that exhibits increased stability over a longer storage period and under a variety of conditions. The antifoam emulsion includes an internal phase consisting of a fatty alcohol dispersion. The emulsion also includes an emulsifier and an external phase including a water insoluble or partially miscible liquid.

Conventional fatty alcohol dispersions can be used for the internal phase of the present invention. For example, fatty alcohols obtained from the Zeigler process or the oxo process are suitable. Additionally, naturally occurring materials are also acceptable.

Suitable carrier liquids for the external phase again are any water insoluble or partially miscible liquid. Examples of the carrier liquid include: Guerbet branched alcohols; octanol; decanol; oleyl alcohol; mineral oil; light petroleum distillates; polybutenes; silicone oil and mixtures thereof.

To promote the formation and stabilization of the mixed emulsion, an emulsifier is used. Simple monomeric emulsifiers as well as polymeric emulsifiers can be used in the present invention. Examples of suitable emulsifiers that can be used to form the antifoam emulsion are alkyl phenol ethoxylates, alcohol ethoxylates, polyether-polysiloxanes, and sorbitan fatty acid esters.

In a preferred embodiment, the mixed emulsion also includes hydrophobic particles. Use of hydrophobic particles, such as hydrophobic silica, in the external phase not only imparts a degree of mechanical stability to the emulsion, but also improves the elevated temperature defoaming performance of the emulsion.

The present invention also provides a method for improving the shelf-life of a fatty alcohol defoamer. This method includes an initial step of providing a fatty alcohol dispersion. Then, the fatty alcohol dispersion is formed into a mixed emulsion within a carrier liquid. In such emulsion, the fatty alcohol dispersion is the dispersed phase inside the emulsion and the carrier liquid is the external phase of the emulsion.

An advantage of the present invention is that it provides an antifoam with improved shelf life. The increased stability of the present invention derives from forming an emulsion where the fatty alcohol active ingredient is confined in an internal phase of the emulsion, and the external phase is a carrier fluid. As a result thereof, the physical properties of the mixed emulsion are determined by the composition of or the state of the external phase of the mixed emulsion, as opposed to the composition of or the state of the internal phase of the formulation. Thus, potential instability of the internal phase is controlled.

Another advantage of the present invention is that the emulsions do not have compromised performance over conventional antifoam agents and, in fact, offer improved persistency of the antifoam effect.

Still further, an advantage of the present invention is that it provides an antifoam formulation with improved elevated temperature performance.

Yet another advantage of the present invention is the broad application of the antifoam emulsion. The emulsion of the present invention not only has significant applications in paper making and paper coating systems, it has a variety of other applications, such as in waste water treatment plants, for paint and coatings, for mining and ceramic manufacture, in the food industry, and in the starch industry. Essentially, the novel antifoam emulsion can be used in any industry for controlling foam.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides a novel antifoam emulsion and a method for improving the shelf life of a fatty alcohol defoamer. The antifoam emulsion consists of an internal phase including a fatty alcohol dispersion, an emulsifier, and an external phase including a carrier liquid (i.e., water insoluble or partially miscible liquid).

As previously noted, the improved shelf life of the present invention arises from positioning a fatty alcohol dispersion in an internal phase of an emulsion. Suitable fatty alcohols that may be used as the internal phase can be any of the conventional antifoam agents used in the paper industry. Both naturally occurring or synthetic alcohols having from 14 to 36 carbon atoms, or mixtures thereof, are suitable. For example, synthetic alcohols obtained from the Ziegler process or by oxo synthesis, both processes of which are known in the art, can be used. Commercially available fatty alcohol compositions that may be used for the internal phase include, for example, 8639 sold under the trademark FOAMBURST, available from Nalco Chemical Company, Naperville, Ill.; and HT 3000 available from BASF.

An emulsifier is used with the fatty alcohol to form the fatty alcohol dispersion. Conventional emulsifiers can be used for this purpose.

The fatty alcohol dispersion accounts for approximately 1 to 50% by weight of the mixed emulsion. In a preferred embodiment, the fatty alcohol dispersion is present in the emulsion in an amount of approximately 5 to 35% by weight.

By way of example, and not limitation, an exemplary method for preparing a suitable internal phase for the emulsion of the present invention will now be given. An exemplary formulation for the internal phase is as follows:

| Ingredient | Percentage |
| --- | --- |
| Alfol 20 + alcohol | 20.00% |
| Ethox NL-14 | 00.65% |
| (14 mole EO monolaurate ester) | |
| Water | 79.35% |

The process for preparing this formulation is as follows. First, the water is heated with mixing to a temperature above the melting point of the Alfol 20 alcohol, which is a Ziegler process alcohol, and is commercially available from Condea-Vista. Next, the Alfol 20 alcohol is added to the water. Then, the Ethox ML-14 is added to the water/Alfol 20 mixture. Ethox ML-14 is a lauric acid ester and is commercially available from Ethox Chemicals. The resulting composition is allowed to cool with mixing to room temperature.

The external phase includes a carrier fluid to improve the shelf-life of the antifoam emulsion. The carrier fluid can be any water insoluble or partially miscible liquid such that the resulting emulsion is insensitive to increases in viscosity or age. Use of a carrier fluid works to isolate the instability of the fatty alcohol dispersion within the internal phase of the mixed emulsion.

A variety of carrier fluids may be used in the external phase of the antifoam emulsion of the present invention. Examples of suitable carrier liquids are Guerbet branched alcohols, such as 2-hexyl-decanol, 2-octyl-dodecanol, 2-butyl-octanol, 2-decyl-tetradecanol or mixtures thereof. Other liquids may be simple liquid alcohols such as octanol, decanol, oleyl alcohol, or mixtures thereof. Still further, other liquids may be mineral oil, liquid petroleum distillates, polybutenes, silicone oil, fatty acid esters, ethers of monohydric to trihydric alcohols, and polypropylene glycol. Examples of commercially available carrier fluids that can be used in the external phase are ISOFOL 20, which is a branched alcohol and is sold under the trademark ISOFOL available from Condea Vista and ISOPAR M, which is a hydrocarbon and is sold under the trademark ISOPAR, available from EXXON.

The carrier fluid in the external phase accounts for approximately 30% to 70% by weight of the mixed emulsion. In a preferred embodiment, the carrier fluid is present in an amount of approximately 35% to 65% by weight based on the emulsion.

The emulsion of the present invention is stabilized with the use of an emulsifier. Simple monomeric emulsifiers as well as polymeric emulsifiers can be used in the present invention. Examples of suitable monomeric emulsifiers that can be used include alkyl phenol ethoxylates, alkoxylated alcohols and esters. Examples of polymeric emulsifiers that can be used include polyethylene glycol esters; polyether-polysiloxane surfactants, polyglycerol esters; polyoxyethylene sorbitan fatty acid esters; poly-12-hydroxy stearic acid polyethylene glycol block copolymer surfactants and sorbitan polyhydroxy stearate. In an preferred embodiment, the emulsifier is selected from the general class of poly-12-hydroxy stearic acid esters that include a variety of hydrophilic components. For example, the hydrophilic components can be polyethylene glycol, polyglycerol, and sorbitol.

A variety of commercially available emulsifiers can be used pursuant to the present invention. For example, the following can be used: Triton and Igepal, alkyl phenol ethoxylates with alkoxylation of between 1 and 20 moles of alkoxide available from Union Carbide and Rhone Poulenc, respectively; Alfonic 1412-40 and 1412-60, alcohol ethoxylates, available from Condea Vista Company; Tegopren 5863 and 5803, polyether-polysiloxane surfactants available from T. H. Goldschmidt; Polyaldo, polyglycerol ester emulsifier available from Lonza; Span 60 and 80, sorbitan fatty acid esters available from ICI Americas and Tween 60 and 80, polyoxyethylene sorbitan fatty acid esters available from ICI.

Another suitable emulsifier is poly-12-hydroxy stearic acid polyethylene glycol block copolymer surfactants. These emulsifiers are available from ICI under the trademark of HYPERMER B-246, for example. In an embodiment, the polyethylene glycol segment has a minimum molecular weight of about 400. Also, the degree of polymerization of the 12-hydroxy stearic acid is, in an embodiment, from approximately 1 to about 10 moles.

The emulsifier used to promote the formation of the mixed emulsion and stabilize same accounts for approximately 0.1% to 10% by weight of the mixed emulsion. In a preferred embodiment, the emulsifier is present in an amount of approximately 0.2% to 5% by weight based on the emulsion.

In addition to dispersing the fatty alcohol formulation in an emulsion of another liquid, hydrophobic particles can be used to impart a degree of mechanical stability to the emulsion. The inventors have found that hydrophobic particles also function as an active ingredient that improves the elevated temperature defoaming performance of the emulsion. The loss of defoaming performance of fatty alcohol defoamers with increases in the temperature of the system to which they are applied is a well known characteristic of this type of defoaming chemistry. The inventors of the present invention found that when the fatty alcohol dispersion consists of a dispersed or internal phase of an invert emulsion, improved elevated temperature performance of the formulation can be obtained by the addition of hydrophobic particles to the external or continuous phase of the emulsion. The hydrophobic particles expand the operability of the emulsion and act as a barrier to coalescence of the fatty alcohol droplets.

A variety of hydrophobic particles can be used in the external phase of the emulsion. In an preferred embodiment, hydrophobic silica is added to the external phase. Suitable hydrophobic silica are commercially available and cover a range of particle sizes. For example, the following commercially available products can be used: Sipernat D-10 and D-17, precipitated hydrophobic silicas available from Degaussa Corp.; Quso WR-55, a hydrophobic silica available from Philadelphia Quartz Corp.; Aerosil R-972, a fumed hydrophobic silica available from Degaussa Corp.; CAB-O-SIL TS-530, a treated fumed silica (surface treatment with hexamethyldisilizane) available from Cabot Corp.; and CAB-O-SIL TS-720, a treated fumed silica (surface treatment with a dimethyl silicone fluid) available from Cabot Corp.

Still further, other hydrophobic particles, aside from hydrophobic silica, can be used in the external phase. For example, bis amide particles, such as ethylene bis steramide, can be useful as particulate actives/emulsion stabilizers. Also, hydrocarbon waxes can be used as additional particulate stabilizes/actives. The waxes can be synthetic or natural in source and may be micronized to form a finely divided powder. Some examples of the particles are: synthetic waxes, polyethylene waxes, polytetrafluoroethylene and polypropylene waxes.

The hydrophobic particles are added to the external phase in an amount of approximately 0.1% to 10% by weight of the mixed emulsion. In a preferred embodiment, the hydrophobic particles are present in an amount of approximately 0.5% to 8% by weight based on the emulsion.

By way of example, and not limitation, an exemplary method for preparing a suitable external phase and mixed emulsion of the present invention will now be given. The formulation for the mixed emulsion of this example is as follows:

| Ingredient | Percentage |
| --- | --- |
| Isofol 20 alcohol | 47–57% |
| Hypermer B-246 emulsifier | 3% |
| Hydrophobic silica | 0–10% |
| Internal Phase | 40% |

The method for preparing the external phase and resulting mixed emulsion is as follows. First, the Hypermer B-246 emulsifier, a polyethylene glycol ester of poly(12-hydroxy stearic acid) available from ICI, is dissolved in the Isofol 20 alcohol, a branched alcohol available from Condea Vista. In an embodiment, the hydrophobic silica can then be added to this mixture. While mixing, the internal phase is added to the Isofol 20/Hypermer B-246 mixture to form a mixed emulsion.

The mixed emulsion may additionally be homogenized with a high-shear device. For example, a Manton Gaulin piston homogenizer or various other pieces of dispersion equipment known to those of skill in the art of emulsion formation may be used.

By way of example, and not limitation, an experiment demonstrating the improved shelf-life of the present invention will now be given. The shelf-life was tested by measuring the viscosity at 25° C. of the test formulations at various time after manufacture.

TESTING PROCEDURE

The 25° Centigrade viscosity was determined with a Brookfield DV-1 model viscometer at 12 rpm using a number two spindle (for thinner samples) and a number three spindle for thicker fluids (>2,500 Cps).

Samples were placed in a 25° Centigrade water bath and allowed to equilibrate. The spindle was then inserted into the sample, connected to the viscometer and the instrument was turned on. The viscosity data was taken after 1 minute. The viscometer reading was then multiplied by a factor that is specific to the speed and spindle used for the determination. The result is the Brookfield Viscosity. Higher values of Brookfield viscosity represent thicker fluids. The data in Table 1 below was taken using this equipment and under these conditions.

TABLE 1

| | Viscosity (Cps) at various times after manufacture (25° C.) | | | | | |
| --- | --- | --- | --- | --- | --- | --- |
| Sample | Initial | 1 day | 2 days | 3 days | 2 weeks | 51 weeks |
| (CONTROL) | 500 | 560 | — | 778 | 7,300 | Solid |
| A | 393 | 243 | 225 | 215 | 268 | 280 |
| B | 205 | 415 | 373 | 320 | 775 | 220 |
| C | 378 | 630 | 753 | 718 | 830 | 538 |
| D | 80 | 78 | 70 | 83 | 70 | 75 |
| E | 208 | 193 | 177 | — | 163 | 210 |

The compositions of the formulations used in this experiment are as follows:

| | | |
| --- | --- | --- |
| Control | Commercial fatty alcohol water-based defoamer | 100% |
| A (101–1) | 2-Octyl-Dodecanol | 54% |
| | Hypermer B-246 Emulsifier | 3% |
| | Control composition | 40% |
| | Hydrophobic silica | 3% |
| B (101–2) | 2-Octyl Dodecanol | 57% |
| | Hyper B-246 Emulsifier | 3% |
| | Control Composition | 40% |
| C (101–3) | 2-Octyl-Dodecanol | 40% |
| | Hypermer B-246 Emulsifier | 3% |
| | Hydrophobic silica | 1% |
| | Control composition | 56% |
| D (101–4) | Decanol | 54% |
| | Hypermer B-246 Emulsifier | 3% |
| | Control composition | 42% |
| | Hyperphobic Silica | 1% |
| E (100–9) | 2-Octyl-Dodecanol | 57% |
| | Hypermer B-246 Emulsifier | 3% |
| | Hydrophobic Silica | 2% |
| | Control composition | 38% |

These results demonstrate that the invert mixed emulsions of the present invention, containing as a dispersed phase a fatty alcohol dispersion, have significantly improved shelf-life over a control fatty alcohol dispersion formula. Only one sample (Control) in Table 1 was extremely viscous and difficult to handle. It was completely solid after 51 weeks of storage.

By way of example, and not limitation, experimental results demonstrating that the formulations containing a hydrophobic silica are more effective than the formulation containing only the substantially fatty alcohol ingredient will now be given. The same formulations as used in the above experiment were tested in this experiment.

DEFOAMING PERFORMANCE TEST

Defoaming performance of a variety of formulations was tested using standard foam testing procedures and equipment. Exemplary testing apparatuses, as used in this experiment, are set forth in U.S. Pat. Nos. 4,968,448, 5,283,002 and 4,956,119. Specifically, the following test solution and calculation was used:

Materials

Pre-cooked Cato 9 cationic starch was provided by the mill and was used as received. The concentration was 3.5 percent solids. The sizing agent, Georgia Pacific Nova Plus rosin size, was provided by the mill. It is sold as a 35 percent dispersion in water and was diluted to 3.5 percent concentration to facilitate solution makeup.

The calcium level of the water was adjusted to 50 ppm as Ca by addition of calcium chloride solution. The calcium chloride solution was prepared by dissolving 18.3408 grams of the dihydrate salt in deionized water to make 1 liter of solution. One milliliter of this solution would contain 5 ppm of calcium metal.

The alum level was adjusted to 6 ppm by addition of aluminum sulfate solution. The aluminum sulfate solution was prepared by dissolving 12.2014 grams of 98.8% $Al_2(SO_4)_3.16\ H_2O$ certified A.C.S. grade aluminum sulfate. One milliliter of this solution would contain 1 ppm aluminum.

Preparation of Synthetic Test Solution For Simulation of Papermachine White Water

REAGENTS

1. Georgia Pacific Nova Plus Size as received (35% actives) prepare a 10% solution.
2. Pre-cooked Cato 9 starch used as received (3.5% solids).
3. Alum solution—12.2014 gm $Al_2(SO_4)_3.16\ H_2O$/liter 1 ml–1 ppm.
4. Calcium chloride solution—18.3408 gm $CaCl_2.2\ H_2O$/liter (1 ml=5 ppm).

TEST SOLUTION CONTAINED 250 ppm Nova Plus Size
500 ppm Cato 9 starch
6 ppm Aluminum
50 ppm Calcium

TESTING PROCEDURE 1. 800 grams of deionized water was weighed into a beaker (1500 ml beaker was used).
2. 14.3 grams of the pre-cooked Cato 9 starch solution was added to the beaker.
3. 7.2 grams of dilute GP Nova Plus dispersed rosin size was added to the beaker.
4. 6 milliliters of the stock alum solution was added to the beaker.
5. 10 milliliters of the stock alum solution was added to the beaker.
6. The pH of the solution was adjusted to 5.5 with 0.10N NaOH solution.
7. The final weight of the solution in the beaker was adjusted to 1000 grams.

TEST APPARATUS

An impinging jet foam generating apparatus was used for generation of foams. The unit is a thermostatically controlled apparatus that is capable of metering a stream of water through an orifice onto a pool of water which is contained in a glass column. The column is approximately 90 mm inside diameter by 550 cm tall. The flow through the 3/16 inch nozzle is approximately 1.5 gallons per minute.

The standard antifoaming test procedure for the impinging jet foam generating apparatus was used for this work. The procedure involves adding 1 liter of test solution to the foam generator and starting the pump and heating cycle. When the solution has reached the desired temperature, the antifoam is injected into the recirculation stream and the pump is turned off momentarily. The two way valve is turned in order to direct the stream through the nozzle and into the glass foam measuring column. Data is taken as the foam ascends in the column. The raw data is in tabular form and consists of recordings of the foam height in centimeters at various times. The raw data is graphed into a foam height versus time curve. More sophisticated data treatment is also used whereby the area under the foam height versus time curve is calculated. The area under the foam height versus time curve was the response used for this work and it is referred to as the foaminess of the solution.

For the data in Table 2, the foaminess of the blank at an arbitrarily chosen 1 minute time period was determined. The foaminess value for a treated sample containing the defoamer was also determined at 60 seconds. The percent foam reduction is calculated as follows:

$$1 - \left( \frac{\text{integrated area of treated sample}}{\text{integrated area of untreated blank}} \right) \times 100\%$$

The percent foam reduction is the data that appears as a measure of sample activity in Table 2. The larger the value, the better the performance as an antifoam.

TABLE 2

| | % Foam Reduction Versus Temperature | |
|---|---|---|
| Sample | 130° F. | 155° F. |
| CONTROL | 51.3% | 38.9% |
| A (101–1) | 64.3% | 64.4% |
| B (101–2) | 42.0% | 43.9% |
| C (101–3) | 56.9% | 52.8% |
| D (101–4) | 42% | 26% |
| E (100–9) | 57.7% | 48.9% |

These test results demonstrate that formulations containing hydrophobic silica are significantly more effective then the control formulations containing only the substantially fatty alcohol ingredient.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An antifoam mixed emulsion comprising:
   an internal oil-in-water phase including a fatty alcohol, a first emulsifier, and water;
   a second emulsifier; and
   an external oil phase including a carrier liquid;
   wherein said first emulsifier disperses said fatty alcohol in the internal oil-in-water phase and said second emulsifier disperses said internal oil-in-water phase in said external oil phase.

2. The antifoam emulsion of claim 1 wherein the fatty alcohol is a fatty alcohol obtained from a Ziegler process.

3. The antifoam emulsion of claim 1 wherein the fatty alcohol is a fatty alcohol obtained from an oxo synthesis.

4. The antifoam emulsion of claim 1 wherein the second emulsifier is selected from the group consisting of: alkyl phenol ethoxylate; alcohol ethyoxylate; polyether-polysiloxane; sorbitan fatty acid ester; poly-12-hydroxy stearic acid polyethylene glycol esters; polyglycerol fatty acid esters and poly-12-hydroxy stearic acid sorbitol esters.

5. The antifoam emulsion of claim 1 wherein the carrier liquid is selected from the group consisting of: guerbet branched alcohol; octanol; decanol; oleyl alcohol; mineral oil; light petroleum distillates; polybutenes; silicone oil; polypropylene glycol; and mixtures thereof.

6. The antifoam emulsion of claim 5 wherein the guerbet branched alcohol is selected from the group consisting of: 2-hexyl-decanol; 2-octyl-dodecanol; 2-butyl-octanol; 2-decyl-tetradecanol and mixtures thereof.

7. The antifoam emulsion of claim 1 wherein the external oil phase further includes hydrophobic particles.

8. The antifoam emulsion of claim 7 wherein the hydrophobic particles are present in a range of approximately 0.1% to 10% by weight of the antifoam composition.

9. The antifoam emulsion of claim 1 wherein the carrier liquid is a water insoluble liquid and is present in a range of approximately 20% to 80% by weight of the antifoam composition.

10. The antifoam emulsion of claim 1 wherein the second emulsifier is present in a range of approximately 0.10% to 10% by weight of the antifoam composition.

11. The antifoam emulsion of claim 1 wherein the internal oil-in-water phase is present in a range of approximately 10% to 70% by weight of the antifoam composition.

12. A method for improving the shelf-life of a fatty alcohol defoamer comprising the steps of:
    providing a fatty alcohol dispersion comprising: a fatty alcohol; a first emulsifier; and water; and
    dissolving a second emulsifier in a water insoluble liquid to form a mixture; and
    mixing the fatty alcohol dispersion with the mixture thereby forming a mixed emulsion of the fatty alcohol dispersion with a water insoluble liquid, wherein the fatty alcohol dispersion is a dispersed phase inside the mixed emulsion and the water insoluble liquid is an external oil phase of the mixed emulsion;
    wherein said first emulsifier disperses said fatty alcohol in said fatty alcohol dispersion and said second emulsifier disperses said fatty alcohol dispersion in said external oil phase.

13. The method of claim 12 wherein the step of providing the fatty alcohol dispersion is further defined by providing approximately 10% to 70% by weight of the fatty alcohol dispersion based on the mixed emulsion.

14. The method of claim 12 further comprising the step of adding hydrophobic particles to the external oil phase of the emulsion.

15. The method of claim 13 wherein the hydrophobic particles are hydrophobic silica.

16. The method of claim 12 wherein the water insoluble liquid is present in a range of approximately 20% to 80% by weight of the antifoam composition.

17. The method of claim 12 further comprising the step of homogenizing the mixed emulsion with a high-shear device.

18. The method of claim 12 wherein the second emulsifier is a mixture of two or more emulsifiers.

* * * * *